United States Patent
Bose et al.

(10) Patent No.: US 6,654,428 B1
(45) Date of Patent: Nov. 25, 2003

(54) SYSTEMS AND METHODS FOR WIRELESS COMMUNICATIONS

(75) Inventors: Vanu G. Bose, Cambridge, MA (US); David L. Tennenhouse, Chevy Chase, MD (US); John V. Gutag, Lexington, MA (US); Michael Ismert, Chestnut Hill, MA (US); Matthew Welborn, Cambridge, MA (US); Alok B. Shah, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/231,335

(22) Filed: Jan. 13, 1999

Related U.S. Application Data

(60) Provisional application No. 60/071,485, filed on Jan. 13, 1998, and provisional application No. 60/079,779, filed on Mar. 27, 1998.

(51) Int. Cl.[7] .......................... H03K 9/00; H04L 27/06; H04L 27/14; H04L 27/22
(52) U.S. Cl. ........................ 375/316; 375/219; 455/418
(58) Field of Search ................................. 375/316, 219, 375/295, 259, 222, 223; 455/418, 103; 702/58; 711/1, 5, 100, 203

(56) References Cited

U.S. PATENT DOCUMENTS

| | | | |
|---|---|---|---|
| 5,216,621 A | 6/1993 | Dickens et al. | 364/483 |
| 5,842,226 A | * 11/1998 | Barton et al. | 711/203 |

OTHER PUBLICATIONS

Mitola J: "The Software Radio Architecture" IEEE Communication Magazine, 33 (5):26–38 (May 1, 1995).

* cited by examiner

*Primary Examiner*—Phoung Phu
(74) *Attorney, Agent, or Firm*—Foley Hoag LLP

(57) ABSTRACT

The invention provides systems and methods that include, inter alia, wireless communication systems that integrate wireless receivers and transmitters with host computer platforms and that include a data access channel that delivers into the memory space of an application program digital data that is representative of a base band modulated signal. Accordingly, these systems can employ wideband digitization of an incoming signal, such as an RF signal, direct the digitized data into the application memory space of a general purpose workstation, and allow an application program operating on the general purpose work station to perform the digital signal processing that obtains the information encoded within the digitized signal.

6 Claims, 5 Drawing Sheets

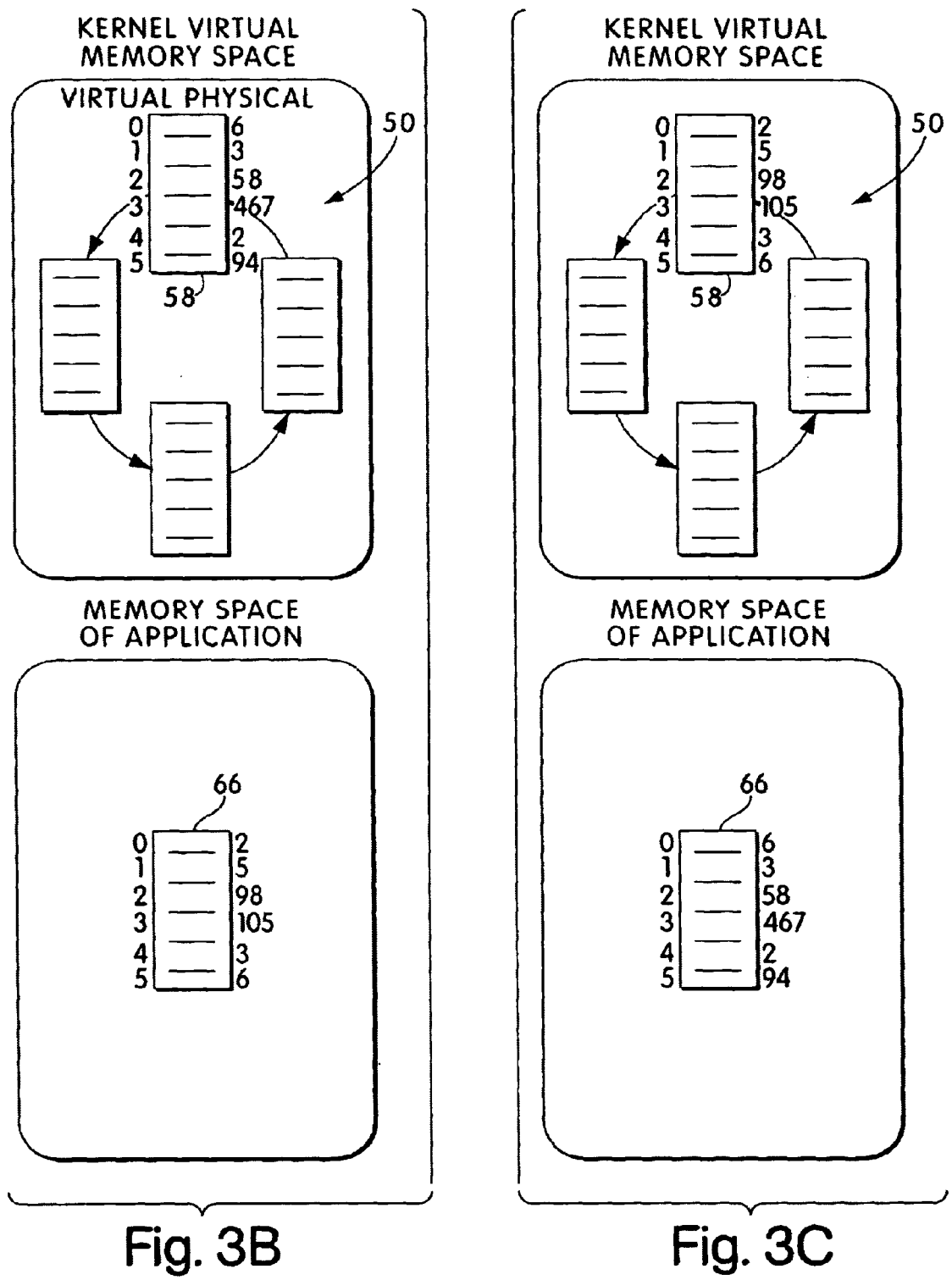

SYSTEMS AND METHODS FOR WIRELESS COMMUNICATIONS

REFERENCE TO RELATED APPLICATIONS

This application claims priority to: U.S. Provisional Patent Application Ser. No. 60/071,485, filed Jan. 13, 1998; and U.S. Provisional Patent Application Ser. No. 60/079,779, filed Mar. 27, 1998; the contents of both of which are incorporated by reference.

FIELD OF THE INVENTION

The invention relates in general to communication systems and in particular to wireless communication systems that can communicate audio,.video and data signals.

BACKGROUND OF THE INVENTION

The field of wireless telecommunications has grown rapidly in recent years, and the demand for wireless telecommunication services and equipment continues to grow. This notable growth is due, in part, to the proliferation of new communication standards and the development of new hardware technologies. For example, the successful adoption of cellular telecommunication standards has promoted the growth of the cellular telephone industry and driven the development of smaller and more power efficient cellular telephones that incorporate new hardware technologies that provide for greater conversion rates between the analog and digital domain, and greater digital signal processing power.

Although the new these new standards and hardware technologies have provided a slew of new devices that often work exceptionally well, these devices are generally dedicated to a specific application and are based on application specific hardware designs are almost always restricted in the functionality they can provide. Specifically, the new hardware devices generally employ application specific hardware architectures, including proprietary bus architectures, components, and other proprietary elements, that reduce the flexibility of these systems and make the systems difficult to upgrade, difficult to extend, and difficult to scale.

In part to address the extensibility issues that arise from the use of proprietary hardware architectures, digital radios, or software radios, have been developed. Software radios employ analog to digital converters and digital signal processors to process a broadcast band signal and generate a stream of data that is representative of the information being transmitted on a selected channel. Brannon, Brad, Wide-Dynamic-Range A/D Converters Pave the Way for Wideband Digital-Radio Receivers, EDN (Nov. 1, 1996). The datastream can then be passed to a software application that further processes the datastream to perform the application at hand. For example, a software radio application that implements an FM radio receiver can process an incoming datastream to decode the signal transmitted on a particular radio frequency assigned to a particular radio station and can play the music or voice signals that were encoded on that RF signal.

Software radios, therefore, provide greater flexibility by providing a datastream to a computer system that can employ an application program to process the datastream as the program dictates. Accordingly, by changing the software that processes the datastream, a user can upgrade, or extend, the functionality that is being implemented by the software radio. This provides greater flexibility and therefore more powerful telecommunication devices.

Moreover, software radios exist today that provide the datastream of the modulated or demodulated data into an application program that can be run on a general purpose workstation. This use of general purpose workstations more readily integrates wireless communication functions with data processing functions and more easily allows wireless communications to be integrated into other data processing systems. For example, this increased level of integration allows software radios to leverage the power of wireless communications along with the resources available on a data processing platform, such as network communications, greater data storage, and other such capabilities.

Although software radios provide increased flexibility over application specific hardware architectures, software radios still employ application specific digital hardware or digital signal processors (DSPs) for performing the signal processing that develops the datastream that represents the information encoded within a broadcast signal. Accordingly, in a software radio the signal processing happens largely within dedicated signal processing hardware, typically on a application specific platform, and little to no opportunity is provided to adapt or alter the way in which signal processing takes place to generate the datastream. For example, even in a software radio, dedicated hardware will still perform the basic signal processing that determines the width of a channel, the number of channels that can be processed at once by the software application, and other similar parameters.

Accordingly, software radios still place a boundary of an application specific hardware architecture between a user's application software and the demodulated data available from the RF signal. This in turn limits the flexibilty of the software radio and reduces the ability to provide telecommunication functions across the data processing environment.

SUMMARY OF THE INVENTION

Accordingly, it is an object of the invention to provide wireless telecommunication devices that can adapt or alter the signal processing being carried out by the wireless communication device.

It is yet another object of the invention to provide wireless communication systems and methods that provide greater flexibility over the datastream generated by the wireless communication device.

Other objects of the invention will, in part, be obvious, and, in part, be shown from the following description of the systems and methods shown herein.

The invention provides systems and methods that include, inter alia, wireless communication systems that integrate wireless receivers and transmitters with general purpose processing platforms and that include a data access channel that delivers into the memory space of an application program digital data that is representative of a modulated signal. Accordingly, these systems can employ wide band digitization of an incoming signal, such as an RF signal, direct the digitized data into the application memory space of a general purpose processing platform and allow an application program operating on the general purpose processing platform to perform the digital signal processing that obtains the information encoded within the digitized signal.

BRIEF DESCRIPTION OF THE DRAWINGS

The foregoing and other objects and advantages of the invention will be appreciated more fully from the following further description thereof, with reference to the accompanying drawings wherein;

FIGS. 3A–3C depict in diagrammatic form the flow of data between the components of the system depicted in FIG. 1;

DETAILED DESCRIPTION OF THE ILLUSTRATED EMBODIMENTS

To provide an overall understanding of the invention, certain illustrative embodiments will now be described, including a cellular receiver wireless communication system. However, it will be understood by one of ordinary skill in the art that the systems and methods described herein can be adapted and modified for other applications and that additions and modifications can be made to the embodiments described herein without departing from the scope of the invention.

The systems and methods described herein include, inter alia, wireless communication systems that integrate wireless receivers and transmitters with host computer platforms and that include a data access channel that delivers into the memory space of an application program digital data that is representative of a modulated signal. Accordingly, these systems can employ wide band digitization of an incoming signal, such as an RF signal, provide the digitized data to the application memory space of a general purpose processing platform and allow an application program operating on the general purpose workstation to perform the digital signal processing that obtains the information encoded within the digitized signal. To this end, the systems and methods described herein optionally include a data interface board for exchanging data between a wireless receiver/transmitter and an input/output bus of the general purpose processing platform, as well as optionally include a programming environment that provides libraries of software routines as well as a framework that includes a class or set of classes that can embody an abstract design for a solution to a wireless communication application.

Figure 1:
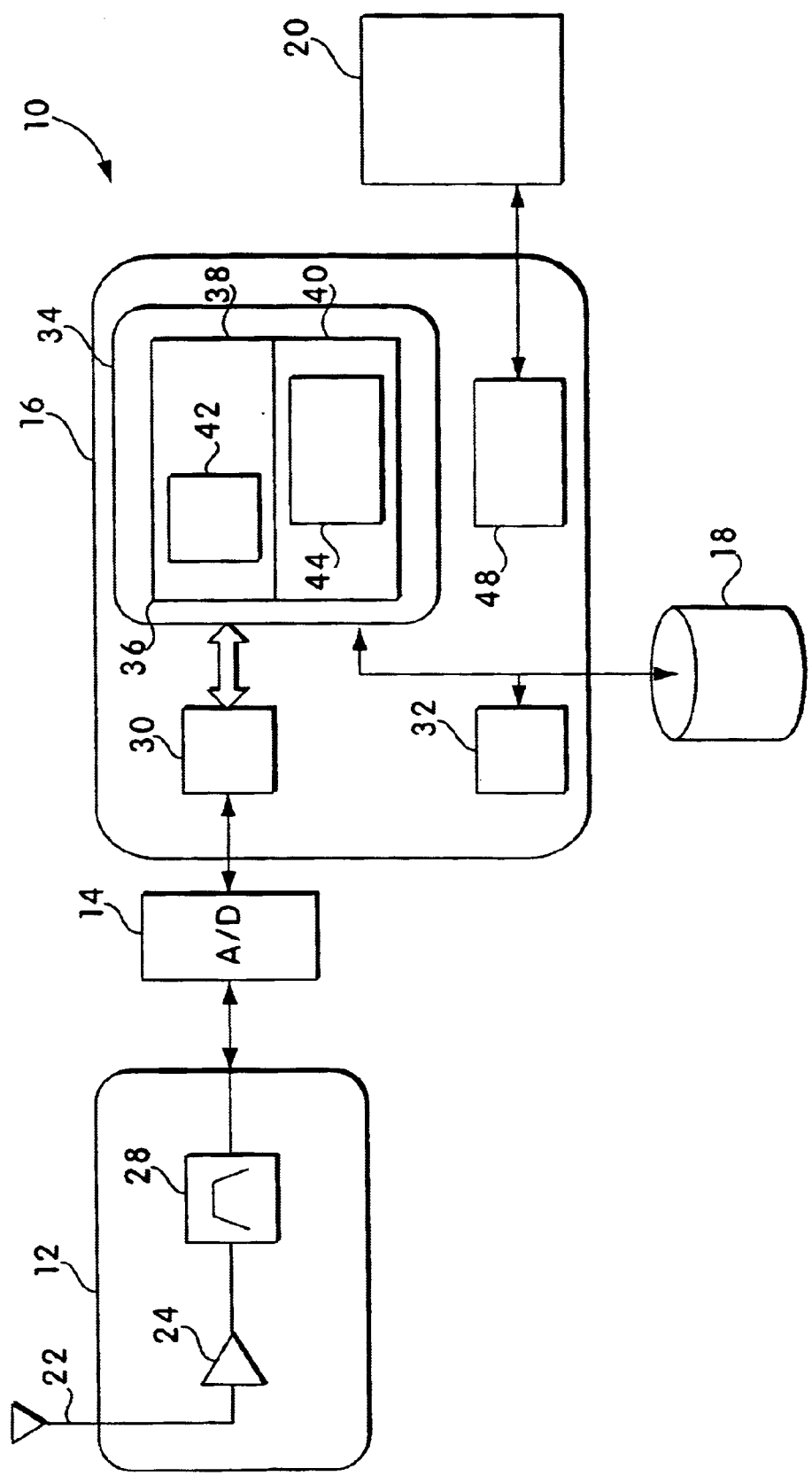
FIG. 1 depicts a functional block diagram of a wireless communication system that includes an application program for processing a modulated signal.

FIG. 1 depicts a wireless communication system 10 that includes a receiver/transmitter 12, a converter 14, a host platform 16, a persistent memory device 18, and an input/output device 20. The depicted system 10 provides a platform on which processes can be run to perform a desired wireless communication operation. As shown in FIG. 1, the receiver/transmitter 12 couples through a bidirectional transmission path to the converter unit 14, which in turn couples through a bidirectional transmission path to the host platform 16. The host platform 16 couples through a bidirectional transmission path to the persistent memory device 18, and through a bidirectional transmission path to the input/output device 20. Simply for the purpose of describing the systems and methods of the invention, the system 10 will described as including an application program that implements a cellular receiver for processing the U.S. cellular band. However, it will be understood that the systems described herein are in no way limited to any particular application, and that other application programs can be run on the system 10 for implementing other applications, including cellular modems, radio receivers, television receivers, wireless network interface cards, remote control devices, such as garage door openers, and channel selection devices, or any other type of wireless communication service, virtual device or application.

In one embodiment, the depicted receiver/transmitter 12 comprises an RF receiver unit that can act as a front end for the system 10 to collect and translate a selected broadcast band of interest to a baseband or a substantially base band signal. To this end, the receiver/transmitter 12 depicted in FIG. 1 includes an antenna element 22 that couples to a preamplifier 24, which couples to a wideband filter 28. The functional components depicted within the receiver/transmitter unit 12 illustrate that the receiver can collect an RF signal and generate from that RF signal a wideband IF signal that can be transmitted to the converter unit 14. In one embodiment, the receiver/transmitter unit 12 can include a commercially available RF receiver, such as the type manufactured and sold by the Tellabs Company of Lisle, Ill. However, it will be apparent to one of ordinary skill in the art that other receiver/transmitters, or tuners can be employed, and the receiver/transmitter device selected depends in part on the application. For example, the unit 12 depicted in FIG. 1 is described as a receiver/transmitter. However, it should be apparent that depending upon the application the receiver/transmitter 12 can be solely a receiver unit, or alternatively solely a transmitter unit. Moreover, the system 10 can include a plurality of receiver/transmitter devices thereby allowing a plurality of transmitter/receiver devices to be coupled to the host platform 16, and wherein each receiver/transmitter device can be capable of receiving or transmitting along different portions of the RF spectrum, including 10 kHz to 1 Ghz, or alternatively, along portions of the microwave spectrum, infrared spectrum, visible light spectrum, or any other suitable communication spectrum or channel.

FIG. 1 further depicts that the system 10 includes a converter element 14. In the embodiment depicted in FIG. 1, the converter element 14 is a high performance analog to digital converter of the type manufactured and sold by the Analog Devices Corporation of Norwood, Mass. The analog to digital converter functions to convert data from the analog domain into the digital domain, and conversely to translate data between the digital domain and the analog domain.

The design and use of converters such as the converter 14, are well known in the art of electrical engineering, and any suitable converter can be employed by the system 10 for translating signals between the analog domain and the digital domain. Moreover, it will be understood that the sampling rate at which the converter 14 is driven normally depends on the bandwidth of interest and, typically the highest frequency in the selected band and the amount of oversampling that is desired for purposes of improving the signal to noise ratio in the digital domain.

The converter element 14 couples through a bidirectional path to the host platform 16, shown in FIG. 1. The host platform 16 can be a general purpose computer work station, such as for example an IBM compatible personal computer running a Pentium class microprocessor having MMX capabilities and operating at a clock frequency of 200 megahertz, with a 33 megahertz internal PCI bus, and at least 64 megabytes of internal random access memory (RAM). The host platform 16 is shown diagrammatically in FIG. 1, and includes an interface device 30, the CPU 32, the operating system 34, computer memory 36 that can maintain a memory space 38 for data and a program memory space 40 for application processes and an output controller 48 that couples to the output device 20. The host platform 16 is merely one embodiment of a general purpose processing platform, and it will be understood by one of ordinary skill in the art that the term general purpose platform encompasses computing platforms that are designed for providing a flexible architecture to facilitate the loading and running of different application programs.

In this example, the host platform 16 operates to perform signal processing on the digitized wideband IF data delivered from the converter 14. To this end, the host processor 16 can run the depicted process 44 within the program memory space 40. The operating system 34, which controls resources on the host platform 16, such as the memory resource provided by the computer memory 36, can allocate to the process 44 a portion 42 of the memory space 38 for use by the process 44. As will be described below, the operating system 34 can control the flow of data between the interface 30 and the portion 42 of the data memory 38 that has been allocated to the process 44, and can allow high bandwidth data transfers between the process 44 and the interface 30. The direct data transfer between the process 44 and the interface 30 provides to the process 44 a constant stream of data samples, or blocks of data samples to process, and reduces or eliminates the time delays and transfer jitter than can arise from the virtual memory operations of the operating system 34, multiple levels of caching and competition for input/output resources.

FIG. 1 further depicts that the host platform 16 can couple to a persistent storage device 18, which can be a hard disk drive, a tape drive, a flash memory or any other type of memory device that can provide persistent storage of data. The system 10 can employ the storage device 18 for storing wideband IF data, demodulated data, or any portion of the data processed by the 5 signal processing application program operating on the host platform 16. FIG. 1 further depicts that the host processor 16 can include an output controller 48 that couples to the input/output device 20. In one embodiment, the output controller 48 can be a sound card, such as the Sound Blaster® card manufactured and sold by Creative Labs of Stillwater, Okla. For this example, the sound card can couple to one or more audio input/output devices such as a microphone and a pair of amplified speakers of the type commonly employed with commercial personal computers. In other applications, the input/output device can include a data display for displaying data transmitted over the wireless channel, as well as a video display such as a television monitor. Moreover, the input/output device can also comprise a device, such as a remote control device, that can be employed for generating or responding to a command signal transmitted over a wireless channel.

Figure 2:
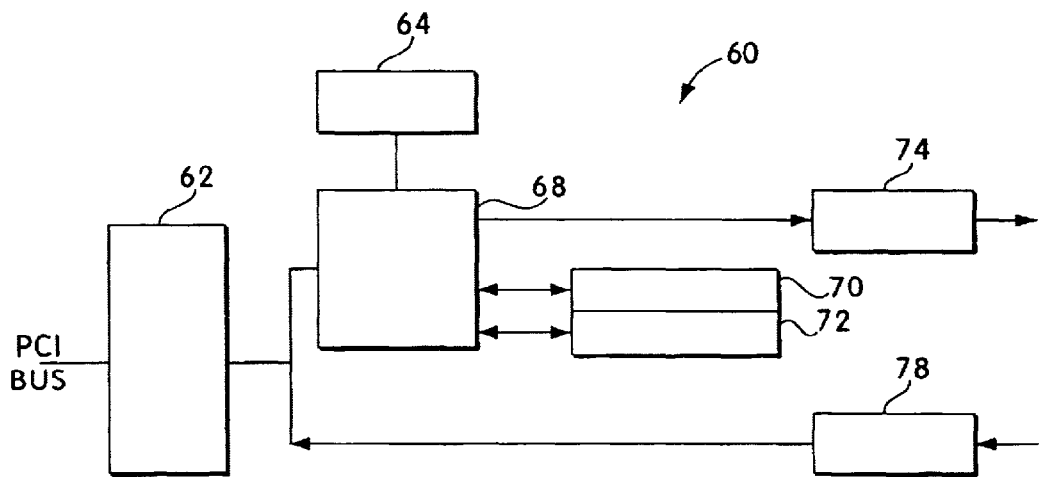
FIG. 2 depicts a functional block diagram of one interface card such as that depicted in FIG. 1.

FIG. 2 depicts one embodiment of an interface card, such as the interface card 30 shown in FIG. 1. More particularly, FIG. 2 depicts an interface card 60 that can be formed as a plug-in card, or a daughter card, that can be inserted into an expansion slot on the motherboard of the host platform 16. As shown in FIG. 2, the interface card 60 can include a PCI/PCI bridge 62, a configuration memory 64, a PCI controller component 68, an output page address memory 70, and input page address memory 72, an output data memory 74 and an input data memory 78. The interface card 60 depicted in FIG. 2 can connect through the PCI/PCI bridge 62 to the PCI bus of the host platform 16, and can connect through the output/input data memories 74 and 78 to the analog front end of the system, such as the converter 14 depicted in FIG. 1.

More specifically, the interface card 60 depicted in FIG. 2 can be a full-size PCI card that is compliant with version 2.0 of the PCI specification. The interface 60 acts as a bus master to perform direct memory access, off loading the transfer of data from the CPU 32, and can act as a target when accessing its control and status registers.

The PCI/PCI bridge 62 can be any commercially available PCI bridge device suitable for interfacing a PCI card to the PCI bus of a work station, such as the host platform 16. One such PCI/PCI bridge component is the 21050-AA, manufactured and sold by the Intel Corporation. The PCI/PCI bridge 62 can couple via a transmission path to a PCI controller element 68. The PCI controller element 68 can be any suitable element for controlling the actions of the interface board 62, and in one embodiment is a field programmable gate array (FPGA) such as the type manufactured by the Xilinx Corporation of Millipatas, Calif. The FPGA can be programmed to contain the PCI controller and DMA engine, to provide a high bandwidth interface between the analog front end and the computer memory 36. Configuration data can be stored in the configuration memory 64, and accessed by the controller 68 at start-up or during operation.

In an optional embodiment, the interface card 60 can have a daughter card interface to which the converter 14 can connect. A daughter card can carry the converter 14, as well as any additional components that can be employed for generating data to be sent to the interface card 60. The depicted interface 60 includes a pair of data buffer memories, such as FIFO memories, each of which exist in the input and output directions for those systems that couple to both receiver and transmitter units. Optionally, a single buffer can be provided for systems which connect only to a receiver or a transmitter unit. The buffers absorb jitter that arises from the bursty access to the PCI bus of the host platform 16. In the input direction, the buffer can hold incoming samples until the interface device 60 acquires the PCI bus and can transfer the data into the memory 36 of the host computer 16. In the output direction, the buffer can hold excess samples that have been transferred from memory 36 but are waiting to be accepted by the converter 14. The buffers 74 and 78 also serve to temporally decouple the timing of the interface card 60, which typically operates using the PCI clock, from converter 14 or from a daughter card, which typically would operate using the converter sampling clock. This reduces, or eliminates, the need for designs that must take into consideration synchronization or metastability issues. It also separates the data transfer and processing from the fixed rate realm of the analog front end, allowing it to be bursty, or sporadic, as is common with shared data transfer resources.

The PCI interface between the interface card 60 and the PCI bus, in the depicted embodiment, has a capacity of about one Gbit/sec. There are also specified upgrade paths for increasing the PCI bus bandwidth by doubling the width from 32 to 64 bits and doubling the speed from 33 megahertz to 66 megahertz, enabling greater bandwidth. Although the interface card 60 depicted in FIG. 2 contemplates interfacing to a PCI bus, it will be understood by one of ordinary skill in the art that in other embodiments, an interface to an ISA bus, an S-bus, or any other data bus capable of transferring information from an interface card to the host workstation 16 can be practiced with the systems described herein.

The depicted interface card 60 acts as a PCI bus master and initiates transfers on the PCI bus. Accordingly, the interface card 60 can perform DMA sample streams to or from the computer memory 36 at a high speed with minimal intervention from the CPU 32. In one embodiment, the interface card 60 implements a variant of scatter/gather DMA that streams pages of data between the computer memory 36 and the interface card 60. To that end, the interface card 60 includes two page address memories, 70 and 72, which can be FIFO memories, one being assigned for input and one being assigned for output. The memories can hold physical page addresses associated with buffers in a memory space, such as the virtual memory space that is organized by the operating system 34. For example, at the end of a page transfer, the interface 60 can read the next page address from the head of the appropriate page address memory and begin to transfer data to or from the memory 36. The interface card 60 can trigger an interrupt when the supply of page addresses runs low, and the page addresses can be replenished by the interrupt handler in the device driver associated with the interface card 60. Accordingly, the interface card 60 stores physical page addresses within the memories .70 and 72, directly on board the interface card 60. Optionally, the page addresses could be stored in a memory table maintained within the computer program memory 36. The interface card 60 depicted in FIG. 2 can transfer complete pages of data between the computer memory 36 and the interface card 60. The transfer of complete pages is understood to result in page aligned, integral page length buffers that are more easy for the operating system 34 to manipulate.

The interface card 60 operates in cooperation with the operating system 34 to achieve the direct memory access transfer of a data buffer into the application data memory 38. In one embodiment, the operating system 34 can be an implementation of the Unix operating system that provides a multitasking operating system that includes a virtual memory system for controlling memory resources on the platform 16. In one specific embodiment, the operating system 34 is the Linux operating system that provides a Unix-like operating system for the Intel processor architecture. Other versions of Unix, or other operating systems can be employed without departing from the scope of the invention. Continuing with the example of a Unix operating system, the operating system can be modified to include a device driver and an enhanced virtual memory system, each of which operate to achieve the direct memory data transfers of pages of data. The device driver allows for continuous data transfer between the interface card 60 and the application data memory 38. To this end, the system can employ a ring of buffers into which samples can be transferred. These buffers can be part of the operating system kernel virtual memory space, and can be locked down in physical memory. Portions of the memory can be locked down using any suitable technique, including the m_lock system call. The device driver can initially fill the input page address memory 72 with addresses from buffers at the head of the ring of buffers. When this memory 72 empties to a certain, programmable, level, the interface card 60 generates an interrupt, and the interrupt handler transfers more buffers from the head of the ring. The level that can trigger the interrupt can be set such that there are sufficient pages remaining to absorb samples arriving before the interrupt handler can provide new addresses.

Figure 3A:
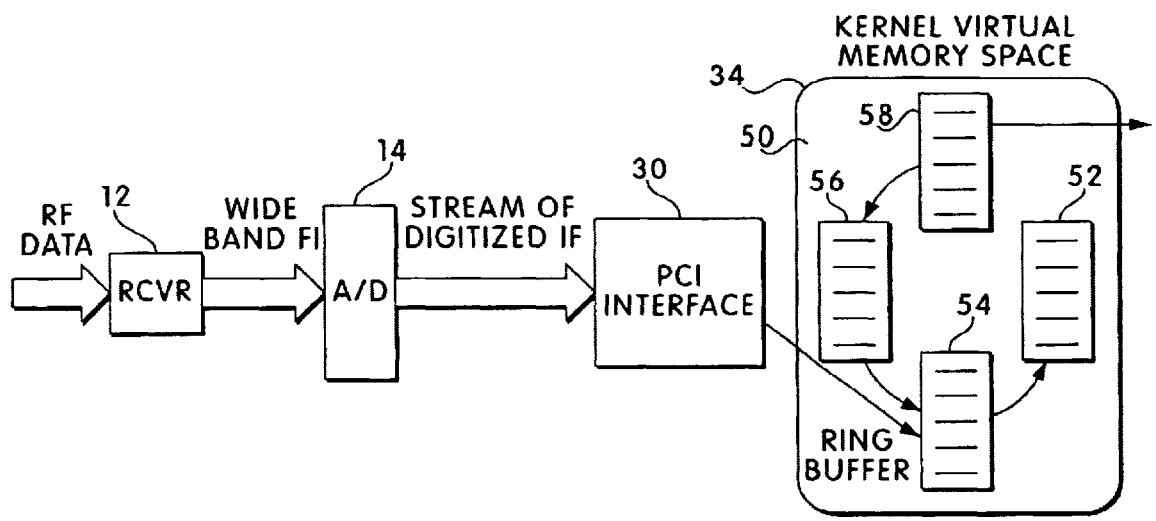

FIGS. 3A–C depict schematically the flow of data that occurs as the data travels through the receiver/transmitter 12, into the ring of buffers and then onto the application memory 38.

Specifically, FIG. 3A depicts that an RF data transmission can be picked up by a receiver unit, such as the receiver/transmitter 12 depicted in FIG. 1. In FIG. 3A, the receiver comprises a multi-band front end that can be software controlled to select a center frequency and a width of an RF band. For example, the 95X family of wideband receivers manufactured by the Rockwell Company provide multi-band front ends that can be configured through software to select a center frequency and a width of an RF band in the range spanning between 2 MHz to 2 GHz. Such front ends allow for multi-band, multi-mode radio systems. In another example, the front end can operate in the 2.5 GHz ISM band. As further shown by FIG. 3A, the wideband signal from the receiver/transmitter 12 can be passed to a converter, such as the converter 14, that can perform direct sampling, band pass sampling, or any other suitable sampling process to provide a stream of digitized IF data. In one embodiment, the IF signal can be digitized by a 12 bit converter such as the AD9042 converter manufactured by the Analog Devices Company. This converter is capable of digitizing signals at a rate of 40 MSPS. This provides a 20 MHz IF bandwidth. As shown in FIG. 3A, the stream of digitized IF data can be provided to an interface with the host computer, such as the depicted PCI interface 30.

The PCI interface can perform a data transfer into the memory 34 of the host platform 16 at a transfer rate that is sufficiently high to meet the timing demands of the process that is performing signal processing on the data, such as the process 44. For example, to transfer a stream of 16 bit samples of a 10 MHz wide IF band (i.e., a minimum 20 MHz sampling rate) to the application process, a 320 Mbits/sec data rate is required. FIG. 3A depicts this transfer of data into the memory 34, by showing the transfer of pages of digitized IF data into a ring buffer 50 that is maintained within the virtual memory space of the kernel. In FIG. 3A, the ring buffer 50 includes four buffers, 52, 54, 56 and 58, each of which as a plurality of pages capable of storing data. However, it will be apparent to one of ordinary skill in the art that the number of buffers provided by the ring buffer 50 can depend upon the application and each buffer can optionally include hundreds of pages of memory space. As discussed above, the interface card 30 has a list of page addresses that designate the memory locations into which the interface card 30 is to provide data. As the interface card operates, pages of data are transferred into the buffers of the ring buffer 50, and the ring buffer 50 can begin to fill. Accordingly, the ring buffer 50 stores data to be transferred to the application memory 38, and optionally provides sufficient storage of data to accommodate those times when the application program is not able to process data at the rate at which data is being delivered, thereby allowing the application can catch-up by, from time to time processing the buffer faster than it fills.

To transfer data to the application memory space 38, the enhanced virtual memory system can act to swap buffers from the application's virtual memory space with buffers in the kernel's virtual memory space. For example, when an application makes a request to read data from the device driver, the application program can be transferred the buffer at the tail of the buffer ring 50. To deliver this buffer at the tail of the ring 50 across the kernel-application boundary, the system 10 performs a buffer swap operation. FIGS. 3B and 3C depict the transfer of data from the kernel virtual memory space to the memory space of the application program.

Specifically, FIGS. 3B and 3C depict the kernel virtual memory space and the buffer ring 50 maintained therein, as well as the application memory space with a buffer 66 stored therein. Each of the buffers depicted in FIGS. 3B and 3C provide storage for a certain amount of data. Associated with this storage are both virtual addresses, depicted on the left-hand side of the buffer 58 as numbers 0–5, and physical addresses, depicted on the right-hand side of the buffer 58 by the numbers 6, 3, 58, 467, 2 and 94. As will be apparent to one of ordinary skill in the art, a physical memory address is representative of the actual physical memory location within the computer memory 34 that is storing the data. Similarly, in the application memory space the buffer 66 has a plurality of pages with these pages having associated virtual memory addresses and physical memory addresses. For buffer 66 the virtual memory addresses are depicted by numbers 0–5, and the physical memory addresses are depicted by numbers 2, 5, 98, 105, 3 and 6. To achieve the transfer of data between the kernel virtual memory space and the memory space of the application program, the physical memory of the buffer being transferred from the kernel virtual memory space is swapped out from underneath the virtual address of the buffer 66 in the application memory space, thereby swapping the buffer provided by the process 44 for the buffer in the system kernel. In one practice, each page in the user buffer is faulted into a distinct physical page. The physical addresses in the page table entries for the kernel and user buffers are then swapped, and therefore, the system affects a data transfer into the application data space by altering the page table within the virtual memory system. The manipulation of Page tables follows from principles well known in the art, including principles set forth in Bach, Maurice, J, The Design of the Unix Operating System, Prentice-Hall, Inc. (1986). Moreover, it will be apparent to one of ordinary skill, that any system for swapping a buffer from the kernel memory space with a buffer in the application memory space can be practiced with the system described herein.

To facilitate the swapping of buffers, the application program, such as the process 44 can, upon initialization, identify or define the size and number of buffers in the buffer ring 50, therefore allowing the process 44 to be aware of the size of the buffer to be provided to any READ system calls made by the operating system. Accordingly, once the application program performs a malloc() system call, a memory allocation will occur that allocates a memory space that is coordinated with the size of a buffer in the buffer ring 50. Consequently, the buffers swapped between the kernel memory space and the application memory space are the same size.

When outputting data, the process 44 can write to the interface card 60, treating the card 60 as an I/O device. Optionally, the device driver can maintain a queue of buffers that the process 44 has written to the device driver. The size of the queue can be bounded to keep processes in applications from employing all of the physical memory available on the host platform 16. In operation, the device driver can first store within the output page address FIFO 70 with addresses of buffers at the head of the queue. When the output page address FIFO 70 empties, or empties to a certain, optionally programmable, level, an interrupt can be triggered by the interface 60 and the interrupt handler of the operating system can replenish the FIFO memory 70 from buffers at the head of the queue, if they are available.

In one embodiment, a system as described herein and running on a 200 MHz pentium pro platform running Linux with a 33 MHz, 32 bit-wide PCI bus, the IO system has been shown to support continuous sample stream rates at up to 512 Mbits per second. The peak burst rates are 933 Mbits per second for input and 790 Mbits per second for output.

Returning to FIG. 1, it can be seen that with the digitized IF data in the program memory 36, the process 44 can then perform signal processing on the digitized IF samples to demodulate the transmitted signal. In one embodiment, the process 44 comprises a cellular receiver process that demodulates the wideband digitized IF data to provide a wideband digital receiver capable of operating in the "A-side" of the U.S. cellular band. This cellular receiver process provides a receiver that can continuously monitor 10 MHz of the cellular band and provide the capability to demodulate FM signals anywhere in that band. In this embodiment, the receiver/transmitter 12 and converter 14 can be integrated into a single unit that comprises a Tellabs RF receiver that translates the 825–835 MHz band to a baseband signal and then samples the signal at 25.6 MSPS. The 12-bit sample stream is fed to the interface card 30 which performs direct memory access to deliver the samples into the memory 36 of the host 16 for processing by the process 44. The process 44 can control the system parameters, such as channel filter size and the various sample rates. This allows parameters to be modified even while the receiver is operating.

Figure 4:
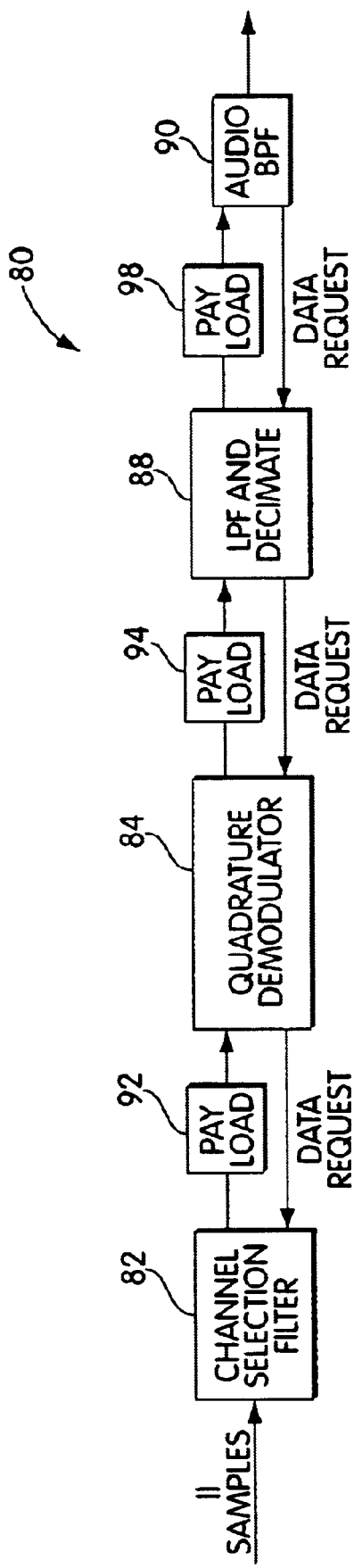
FIG. 4 depicts as a functional block diagram one embodiment of a cellular receiver process that processes digitized IF samples delivered into the memory space of the process.

FIG. 4 provides a function block diagram of one cellular receiver process that can demodulate the sampled IF data being provided to the program memory 36. The cellular receiver process can be an executing computer program that operates in the program space 40 of the computer memory 36. The computer program can be written in C, C++, Java, or in any suitable computer language, and developed using standard software debugging tools. The program can also include routines from commercially available components, such as the FFTW package developed by Matteo Frigo and Steven G. Johnson, and freely distributed, which provides routines of signal processing algorithms. Other commercially available libraries of routines or sets of classes for building user interfaces, or for other functionality can be employed. As is known to those of ordinary skill in the art, the program can comprise a plurality of routines, classes or modules, each of which perform a portion of the processing that is carried out by the cellular receiver process 80. As depicted in FIG. 4, the cellular receiver process 80 can include a channel selection stage 82, a quadrature demodulator stage 84, a low pass filter and decimation stage 88 and an audio band pass filter 90 and an output controller 48. As discussed above, the IF samples can be provided through DMA transfer into the memory space of the application program. The IF samples can be transferred at the system transfer rate, and the cellular receiver 80 can be responsible for operating at sufficient speed to process incoming samples, thereby avoiding the dropping of samples.

As depicted by FIG. 4, the cellular receiver process 80 can employ a "data pull" architecture. While the flow of data is from input to output, the flow of control is from output to input. By placing control downstream, the architecture facilitates the construction of systems that can aggressively employ lazy evaluation and adapt to the requirements of the downstream modules. The total amount of processing that needs to be done is reduced because downstream components can request just the data they need from upstream modules. Consider, for example, an audio system to which a variety of output devices can be attached. The driver for the output controller 48 can control the amount of data required depending upon the application, for example telephone quality, at 8 kHz sampling rate with 8 bit quantization, or CD quality audio, at 44 Khz sampling rate with 16 bit quantization.

The depicted cellular receiver process 80 employs an upstream communication path for controlling data transfer between the stages of the process. In one practice, each module is capable of requesting data from the next upstream module. Accordingly, each module can call the immediately upstream module (or modules) requesting the needed data. The data delivered between modules can be done on a sample by sample basis. Alternatively, the process 80 can operate on blocks of data, or payloads. The data payloads, such as the depicted payloads 92, 94 and 98 can be made large enough to take advantage of data and instruction caching effects, but small enough to avoid introducing unacceptable latency. To process the data payloads, the signal processing applications can employ algorithms designed to work on blocks of data rather than on single samples, which for example would include signal processing algorithms such as the fast Fourier transform. The development of other such algorithms follows from principles well known in the art, including principles set forth in Oppenheim et al, Digital Signal Processing, Prentice-Hall, Inc. (1975).

To process the data, the cellular receiver process 80 includes the channel selection filter stage 83. This stage, or module, has the task of extracting from the digitized IF samples a nar-rowband FM signal (AMPS channel bandwidth is 30 kHz) from a 10 MHz wide frequency band. This depicted stage 83 accomplishes this task using a filter design that combines three steps of translating the signal to baseband, lowpass filtering and decimating to an intermediate sample rate. This step of processing comprises the largest portion of the computational load. The channel selection filter 82 employs the raw samples from the RF frontend at $R_s$=25.6 MSPS as input and produces a complex baseband signal at a variable intermediate sample rate, $R_D$.

Separating narrowband channels in a wideband receiver is a computationally intensive task that is usually done using special purpose hardware, such as a digital down-converter (DDC) implemented in dedicated hardware. Rupert Baines, the DSP Bottleneck, IEEE Communications Magazine, 33(5): 46–54 (May 1995). The wideband signal is translated to a complex baseband signal by the quadrature multiplier and then lowpass filtered to prevent aliasing due to decimation. Special purpose FIR filters for decimation exist that do this operation efficiently-which is important since the sample rates for a wideband receiver could be in excess of 30 MSPS. Estimates have been made that a channel selection filter can require about 100 operations per input sample for a total of 3000 MOPS.

In one embodiment, the channel selection filter 82 follows the structure of a hardware DDC. Multiple threads could be employed to implement in software the structure of the hardware DDCS, wherein the separate steps of the down-conversion process, that is, the generation of the sine/cosine multiplication factors, frequency translation, and filtering, are done in separate physical locations in the DDC, and a high degree of pipeline parallelism is achieved. Furthermore, there can be additional fine grained parallelism within the FIR filter.

Figure 5:
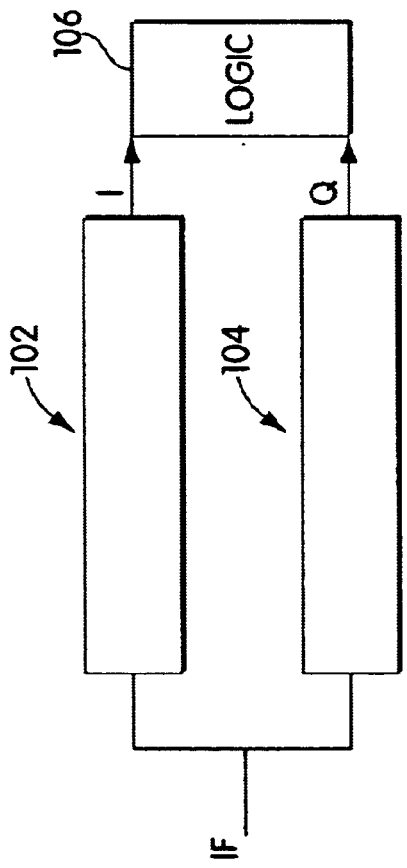
FIG. 5 depicts an alternative embodiment of a downconverting module that can be employed with the cellular receiver process depicted in FIG. 4.

FIG. 5 depicts an alternative embodiment of a software DDC, that operates to perform reduced processing of samples at the high sample rate and reduce the rate early in the processing chain. As shown in FIG. 5, the software DDC intakes samples of the digitized wideband IF signal and provides the samples to two routines, represented functionally by blocks 102 and 104, for performing frequency translation and decimating low pass filtering, to produce in phase and quadrature signals. Both the in phase and quadrature signals are provided to the logic block 106. Logic block 106 can collect the data and provide any formatting and transfer functions required for delivering the data payload to another module. In this embodiment, an FIR filter is employed (versus a lower-order IIR filter) to allow the production of an output signal that depends upon the filter input samples, x[n], and therefore to compute only those output samples, y[n], that will be required after decimation. This is understood to reduce the computation load by taking advantage of the large decimation factors that will exist when processing a narrowband signal in a wideband receiver. Furthermore, the precomputed frequency shift factors can be incorporated into a composite FIR filter and will then require only a phase correction after each output sample is calculated. This feature makes this a time-varying FIR filter, but all of the variation can be combined into a single, time-varying multiplicative factor which is applied after the filtering. In a particular embodiment, the steps of multiplication and convolution that perform the frequency shift and filtering have been combined to produce the composite filter. To this end, the process performs a first step in the selection of a specific channel that translates (in frequency) the real-valued received signal samples, r[n], to baseband by multiplication with the appropriate complex exponential:

$$x[n]=r[n]e^{-j2\pi f_c nTs}=r[n]\{\cos(2\pi f_c nTs)-j\sin(2\pi f_c nTs)\} \quad (1)$$

where $f_c$ is the carrier frequency before translation to baseband and Ts is the sample interval. Next, the result is filtered with an order-M FIR filter h[m]:

$$y[n] = \sum_{m=0}^{M} h[m]x[n-m] = \sum_{m=0}^{M} h[m]r[n-m]e^{-j2\pi f_c(n-m)Ts} \quad (2)$$

At this point, the two steps of frequency translation and filtering can be combined:

$$y[n] = \quad (3)$$

$$e^{-j2\pi f_c nTs}\sum_{m=0}^{M} h[m]r[n-m]e^{j2\pi f_c ms} = e^{-j2\pi f_c nTs}\sum_{m=0}^{M} :c[m]r[n-m]$$

where $c[m]=h[m]e^{-j2\pi f_c mTs}$ are the composite filter coefficients. This process is understood to reduce the number of computations, as well as eliminate the need to compute the unfiltered baseband signal, x[n], which includes the burden of writing the intermediate results to memory only to recall them in the next step. Also, while many techniques are available to design real-valued FIR filters to meet desired specifications with minimum order, the use of complex-valued filter coefficients for h[m] is understood to impose no additional computational cost. Accordingly, the process can take advantage of recent advances in the design of complex-coefficient FIR filters to reduce the required filter order M of the original LPF, relative to a real-valued h[m], without increasing the required computation load for the final composite filter.

This above described process is only one process capable of downconverting the incoming signal, and other techniques that, depending upon the application, may be less complicated to set-up and may employ less memory to store filter coefficients, can be employed. The above described process also requires knowledge of the desired carrier frequency to compute the filter coefficients, c[m], and to recompute the coefficients when a change in the frequency to which the filter is tuned (or else precompute and store separate filters for any desired frequencies) is desired. However, as each set of filter coefficients may be employed many thousands or millions of times, the cost of precomputing or recomputing can yield improved efficiency. This technique is similar to the idea of using an analytic filter to select only the positive frequency components of the real-valued signal for the passband of interest and decimating, but the combination of translation and lowpass filtering in FIG. 5 allows the filter to be quickly redesigned to select a different $f_c$. Moreover, the overhead incurred by storing these coefficients is minimal given that processing occurs on a general purpose processing platform, and that data structures are available as options/means for storing data. Other filter designs can include employ randomized algorithms as an efficient way to prevent aliasing during the decimation process. Additionally, it will be apparent from the above description, that the wideband processing systems described herein can be employed to process multiple channels within the wideband signal, wherein each channel can be processed by a separated process or module, or by a single process that seeks transmissions that are 8. Moreover, the system can be employed to perform channel selection according to any method including FDMA, TDMA, CDMA or spread spectrum.

Turning again to FIG. 4, in a complex FM signal, the desired information (the voice, in the case of a cellular telephone) is carried by the instantaneous frequency, which is the time derivative of the phase of the complex signal. This signal is therefore demodulated using a simple quadrature demodulation algorithm that approximates the derivative of the signal phase by the phase difference between successive samples, appropriately scaled. This quadrature demodulation is carried out by stage 84 of the process 80.

The two final steps of processing are implemented as finite impulse response (FIR) filters. The first can be simply a lowpass decimating filter that removes high frequency components that would cause aliasing when the sample rate is reduced to the audio rate, $R_A$, typically 8K samples/sec. This is carried out in stage 88. The final step, carried out in stage 90, is an optional bandpass filter that removes out-of-band noise from the voice signal.

To facilitate the development of signal processing programs, such as the above described cellular receiver process 80, the system optionally can include a programming environment that supports the development of application programs that process the digitized IF samples to provide, for example, portable, adaptive signal processing systems with real-time constraints. The programming environment can include a library of routines, or a class or set of classes, written in a computer programming language, such as the C, C++ or Java language. Optionally, the programming environment can include an object-oriented application framework that consists of a library of classes that are designed to be extended and subclassed by the application programmer, packaged along with several illustrative sample applications that use those classes and which are designed to be modified by the application programmer. The sample applications generally constitute a system that is useful in its own right. Frameworks can provide functionality and "wired-in" interconnections between the object classes that provide an infrastructure for the application developer. The inter-connections can provide the architectural model and design for developers and free them to apply their effort on the problem domain. By providing an infrastructure, the framework can decrease the amount of standard code that the developer has to program, test, and debug. In general, the basic concept of a framework is well known to one skilled in the art. Some example frameworks include X Toolkit, Motif Toolkit, Smalltalk Model-View-Controller GUI, and MacApp.

Optionally, the programming environment can support adaptive signal processing, including adaptive programming for achieving adaptation to environment factors, such as for example, an application program that implements a modem capable of equalizing for the channel. To this end, the system can provide algorithms to detect environment changes, such as channel estimation algorithms, and a mechanism for specifying system modifications based on the detected changes. Similarly, the programming environment can support adaption to the user to allow for user requirements that may change dynamically and necessitate changes in the system, or in operating parameters of the system. For example, the programming environment can provide for user changes such as a user changing a parameter representative of the station on a radio. Similarly, the programming environment can allow for activating a control representative of a push button for selecting between AM/FM broadcasts. The change between AM and FM broadcasts requires a change in algorithms employed by the application program to demodulate the digitized IF data. The programming environment can further include routines or classes for allowing functional adaptation. Functional adaption provides for signal processing techniques, such as a phase-locked loop, that are inherently adaptive. These techniques typically adapt to the signal, and may modify system parameters or functionality to meet specified requirements. For example, a receiver attempting to lock on to the start frequency of a hopping sequence can adapt the system to examine different frequencies until a start code is found. This type of adaptation can be driven by a specified constraint, without the need for an external change, or in cooperation with an external change. Additionally, the system can provide for adaption in response to the availability of resources. For example, the application program can detect if there are spare CPU cycles available. If CPU processing power is determined to be available under the current system conditions, then running a more computationally intensive channel estimation algorithm can be employed to seek better overall system performance. Conversely, if the resources suddenly become scarce due to a burst of activity by other processes, the system can adapt, perhaps by running less demanding algorithms and sacrificing some robustness or accuracy. This form of adaptability also enables applications to transparently improve performance as faster processors become available.

The system described above, allows for the transmission and reception of cellular communications using the US cellular band. However, an advantage of performing processing in software is that the transmission process can be separated from the reception process, and therefore, the systems and methods described herein allow for virtual communication patch systems, wherein the same device can receive and decode transmission under one protocol, and broadcast transmission under another protocol. This allows for forming a patch between disparate wireless systems. In another example, a radio transmission broadcast using frequency modulation, could be received and decoded, and then encoded using amplitude modulation and rebroadcast, thereby allowing AM receivers to receive the same data as FM receivers.

In another embodiment, the systems described herein can include network interface cards (NICS) that implement signal processing in software, thereby providing a wireless network interface functionality that can be dynamically modified. The software wireless network interface can be compatible with a commercial frequency hopping radio operating in the 2.4 GHz ISM band employing FSK modulation. Parameters such as the FSK frequency deviation and the spacing of the hopping channels can be dynamically modified in software, with the constraints imposed by the hardware being the width of the IF band and the RF band to which the signal is converted. The ability to dynamically modify the channel width, channel spacing and the hopping sequence allows the system to adapt to its environment and provide better noise rejection and immunity from hostile jamming attacks.

Figure 6:
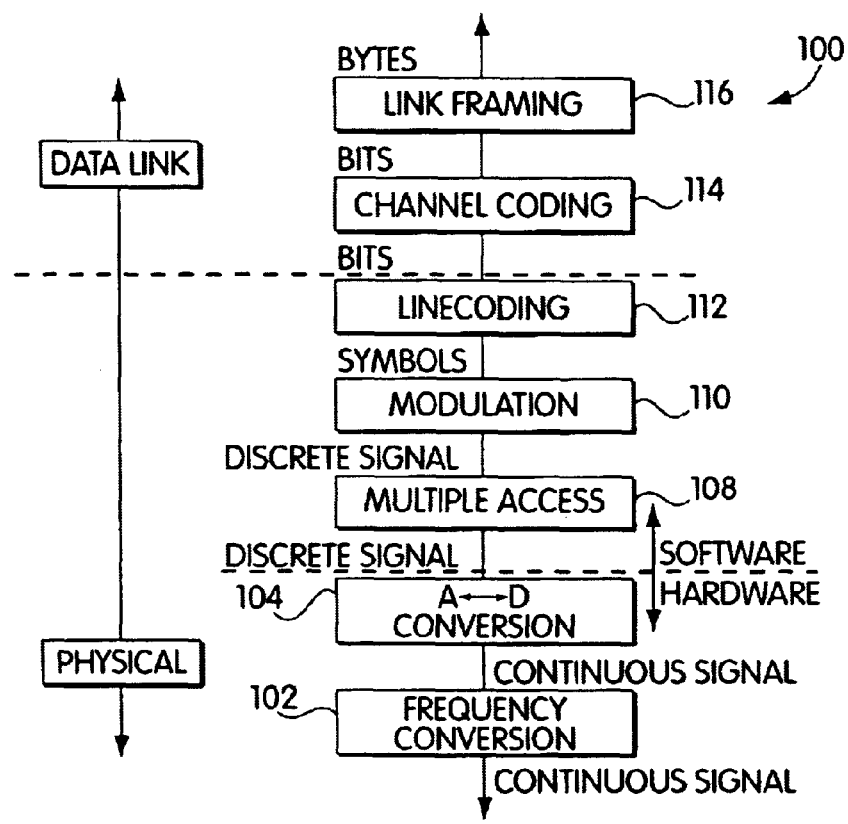
FIG. 6 depicts the network layers of a network interface card according to the invention.

The software network interface architecture can be a refinement of the OSI layering model, which subdivides the existing Link and Physical layers as shown in FIG. 6. As shown, the software NIC can connect to a hardware device that implements the processing of layer 102, the frequency conversion, and layer 104, conversion between the analog domain and the digital domain. Once data is in the digital domain, the software NIC can implement those other layers that are to be performed for network data transfers. As shown in FIG. 6, these layers include the multiple access layer 108, the modulation layer 110 and the line coding layer 112. The multiple access layer 108 can be implemented according to perform suitable protocol that shares the data transfer medium. In layer 110, the modulation of the selected IF data can occur to collect the data transmitted over the wireless channel. In layer 112, the data can be coded as required for transmission. The data link layers 116 and 114 can also be implemented by any suitable technique that can perform the data encapsulation and decapsulation and the transmit/receive media-access management.

Figure 7:
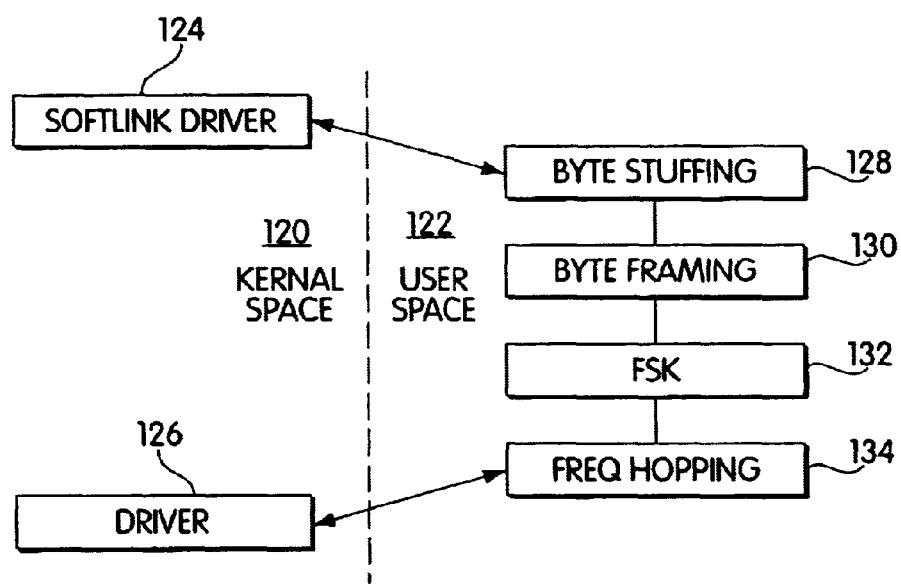
FIG. 7 depicts as a functional block diagram, the software components of an application for transmitting packets of network data.

The sequence of processing modules for the transmission application is shown in FIG. 7. The system interfaces with the host at the IP layer, through a device driver 126 that can appear to the kernel as just another network device driver. However, instead of handing the packets off to a hardware device, this driver hands them up to user space 122, where the software radio processing is performed. The first level of processing is the net work framing. For this example, the packets can be framed and byte stuffed to carry the data. A length code, indicating the total length of the packet including the stuffed values, can be inserted after the start code. The next module takes the sequence of bits output by the network framing layer and performs byte framing, inserting start, stop and parity bits.

The conversion of each bit into a discrete signal is performed by the FSK module 132 and the frequency hopping module 134 then assigns this waveform to the appropriate frequency. All of the possible transmission waveforms can be known a priori. There are two possible waveforms, corresponding to 1 or 0, for each hop frequency. All of these waveforms can be pre-computed and stored at startup, significantly reducing the computation required to produce the transmitted waveform. On a 180 Mhz Pentium Pro 2.2 microseconds were required for producing the IF waveform corresponding to a single bit. This corresponds to a possible transmit data rate of ≈450 kbps.

To generate continuous phase waveforms the pre-computed waveforms are actually oversampled, and a sub-sampled set, corresponding to the output sampling rate, are copies into the output buffer. The oversampling allows for indexing into the buffer to match the phase, and the pattern can be treated as a circular buffer, allowing the generation of waveforms for any bit period. After copying the samples to the output buffer, the phase value is updated and used as the index for the waveform corresponding to the next bit. In a similar manner, the system can maintain continuous phase between hops, even when the hop occurs in the middle of the bit.

Reception is essentially the reverse of the transmission system shown in FIG. 7. The receiver detects the presence of a valid transmission and synchronizes to it, as well as performs the inverse function of each of the transmission layers. Again, combining the parameters of the frequency hopping and the FSK demodulation, the system can constrain the receiver to look for one of the two valid waveforms at a given hop frequency. Separate functions were implemented to track the hopping sequences, and to lock onto and demodulate the bits. These bits are de-framed, and then the IP packets is extracted. The driver then hands the packet off to the host IP layer for processing.

Those skilled in the art will know or be able to ascertain using no more than routine experimentation, many equivalents to the embodiments and practices described herein. For example, it will be understood that the systems and methods described herein can be employed for developing baseband communication systems, as well as system for developing baseband applications. It will also be understood that the systems described herein provide advantages over the prior art including the ability to select one or more channels from a wideband IF signal, and selectively process the channel.

Accordingly, it will be understood that the invention is not to be limited to the embodiments disclosed herein, but is to be understood from the following claims, which are to be interpreted as broadly as allowed under the law.

We claim:

1. A method for processing a radio signal, comprising:
converting, in an analog domain, between a radio frequency signal and it analog intermediate frequency signal;
converting between the analog intermediate frequency signal and corresponding digitized intermediate frequency signal data;
buffering the digitized intermediate frequency signal data in a buffer;
transferring by direct memory access, in page multiples, pages of digitized IF signal data between the buffer and system space of memory;
processing the digitized intermediate frequency signal data in a computer program;
switching at least a page of random access memory, in which digitized intermediate frequency signal data is stored, from system space to user space so that an application can access the data;
switching at least another page from user space to system space to enable direct memory access transfer relative thereto; and
processing the digitized intermediate frequency signal data in user space from the application.

2. A method for processing a radio signal, comprising:
converting, in an analog domain, between a radio frequency signal and it analog intermediate frequency signal;
converting between the analog intermediate frequency signal and corresponding digitized intermediate frequency signal data;
buffering the digitized intermediate frequency signal data in a buffer;
transferring by direct memory access, in page multiples, pages of digitized IF signal data between the buffer and system space of memory;
processing the digitized intermediate frequency signal data in a computer program;
maintaining, in a direct memory access controller, a list of the address of the system space pages which are available for data transfer, removing a page address when corresponding data has been transferred; and providing new page address by interrupting a processor when the number of page addresses in the list falls between a predetermined threshold, such that an interrupt handler provides the new page address.

3. The radio, comprising:

a receiver for translating a signal between radio frequency and intermediate frequency;

a converter which converts between the intermediate frequency signal and a stream of data;

an input/output buffer which holds the data;

a random access memory comprising a user space and a system space, and a direct memory access controller that can access the system space, the memory being organized into pages wherein pages in user space can be switched to system space, and pages in system space can be switched to user space;

a direct memory access controller which transfers, in a page multiples, pages of data between the input output buffer and system space; and a software application which accesses user space.

4. The radio of claim 3, further comprising:

a list of addresses of system space pages which are ready for data transfer, said list being maintained in the DMA controller, wherein new page address are added to the list by interrupting a processor when the number of page addresses falls below a predetermined threshold, such that the interrupt handler provides the new page addresses.

5. A radio comprising:

a tuner for transforming a radio-frequency signal into an intermediate frequency signal, a data processing platform having a processor and a memory, a computer program operating on said data processing platform for demodulating a digital data signal representative of an intermediate frequency signal, a converter for translating said intermediate frequency signal into a digital data signal and for storing said digital data signal into a portion of said memory that is mapped into a memory space associated with said computer program, and an operating system capable of allocating memory resources to programs operating on said data processing platform, and for providing said converter with address signals representative of a portion of said memory space associated with said computer program.

6. A radio, comprising:

a tuner for transforming a radio-frequency signal into an intermediate frequency signal, a data processing platform having a processor and a memory of an application program, a computer program operating on said data processing platform for demodulating a digital data signal representative of an intermediate frequency signal, and a converter for translating said intermediate frequency signal into a digital data signal and for storing said digital data signal into a portion of said memory that is mapped into a memory space associated with said computer program; and an operating system capable of allocating memory resources to programs operating on said data processing platform, and for providing said converter with address signals representative of a portion of said memory space associated with said computer program.

* * * * *

UNITED STATES PATENT AND TRADEMARK OFFICE
CERTIFICATE OF CORRECTION

PATENT NO. : 6,654,428 B1
DATED : November 25, 2003
INVENTOR(S) : Bose, V.G. et al.

It is certified that error appears in the above-identified patent and that said Letters Patent is hereby corrected as shown below:

Column 1,
Line 10, insert -- Government Support. This invention was made with government support under Contract Number DABT63-95-C-0060, awarded by the U.S. Army. The government has certain rights in the invention. --

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,654,428 B1
DATED         : November 25, 2003
INVENTOR(S)   : Bose, V.G. et al.

It is certified that error appears in the above-identified patent and that said Letters Patent is hereby corrected as shown below:

Title page,
Item [75], Inventors, please replace "Gutag" with -- Guttag --.

Signed and Sealed this

Seventeenth Day of August, 2004

JON W. DUDAS
*Acting Director of the United States Patent and Trademark Office*